United States Patent
Hiramatsu et al.

(10) Patent No.: US 11,734,843 B2
(45) Date of Patent: Aug. 22, 2023

(54) OBJECT TEXTURE MEASUREMENT DEVICE

(71) Applicant: FUJIFILM Business Innovation Corp., Tokyo (JP)

(72) Inventors: Takashi Hiramatsu, Kanagawa (JP); Yoshitaka Kuwada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 328 days.

(21) Appl. No.: 16/885,289

(22) Filed: May 28, 2020

(65) Prior Publication Data

US 2021/0097705 A1  Apr. 1, 2021

(30) Foreign Application Priority Data

Oct. 1, 2019 (JP) .............................. JP2019-181398

(51) Int. Cl.
*G06T 7/00* (2017.01)
*G06V 20/64* (2022.01)
*G06T 7/40* (2017.01)
*G06V 10/80* (2022.01)

(52) U.S. Cl.
CPC .............. *G06T 7/40* (2013.01); *G06T 7/0002* (2013.01); *G06V 10/803* (2022.01); *G06V 20/64* (2022.01)

(58) Field of Classification Search
CPC ......... G06T 7/40; G06T 7/0002; G06V 20/64; G06V 10/803; G06K 9/6289
USPC .................................................. 382/100, 108
See application file for complete search history.

(56) References Cited

U.S. PATENT DOCUMENTS

| | | | |
|---|---|---|---|
| 8,293,736 B2 | 10/2012 | Li et al. | |
| 2004/0174374 A1* | 9/2004 | Ihara ...................... | G06F 3/016 345/581 |
| 2004/0181362 A1* | 9/2004 | Brost ...................... | G01B 5/20 702/167 |
| 2009/0013771 A1* | 1/2009 | Kang ...................... | G01B 5/28 73/105 |
| 2009/0146948 A1* | 6/2009 | Lee ......................... | G06F 3/016 345/156 |
| 2015/0212330 A1* | 7/2015 | Li ........................... | G06F 3/013 345/419 |
| 2016/0091299 A1* | 3/2016 | Smythe ............... | G01B 9/02038 356/489 |
| 2020/0004339 A1* | 1/2020 | Naya ...................... | G06F 3/013 |

FOREIGN PATENT DOCUMENTS

| | | |
|---|---|---|
| JP | H11248439 | 9/1999 |
| JP | 2004145456 | 5/2004 |
| JP | 2004212088 | 7/2004 |

(Continued)

OTHER PUBLICATIONS

"Office Action of Japan Counterpart Application", dated May 23, 2023, with English translation thereof, p. 1-p. 6.

*Primary Examiner* — Sheela C Chawan
(74) *Attorney, Agent, or Firm* — JCIPRNET

(57) ABSTRACT

An object texture measurement device includes a visual detection unit that detects a visual texture of an object, a tactile detection unit that detects a tactile texture of the object, and an acquisition unit that acquires a detection result of each of the visual detection unit and the tactile detection unit while relatively moving each of the visual detection unit and the tactile detection unit with respect to the object.

20 Claims, 3 Drawing Sheets

(56) References Cited

FOREIGN PATENT DOCUMENTS

| | | |
|---|---|---|
| JP | 2009020108 | 1/2009 |
| JP | 2011242293 | 12/2011 |
| JP | 2012037420 | 2/2012 |
| JP | 2013531022 | 8/2013 |
| JP | 2017102755 | 6/2017 |
| JP | 2017204276 | 11/2017 |
| JP | 2018105792 | 7/2018 |

* cited by examiner

OBJECT TEXTURE MEASUREMENT DEVICE

CROSS-REFERENCE TO RELATED APPLICATIONS

This application is based on and claims priority under 35 USC 119 from Japanese Patent Application No. 2019-181398 filed Oct. 1, 2019.

BACKGROUND

(i) Technical Field

The present invention relates to an object texture measurement device.

(ii) Related Art

JP2017-204276A discloses a machine learning support device including an information generation unit that generates a plurality of pieces of virtual information corresponding to output information of a plurality of sensors, a learning support unit that causes an artificial intelligence device to learn using the plurality of pieces of virtual information generated by the information generation unit, and a verification support unit that verifies an operation of the artificial intelligence device after learning using the plurality of pieces of virtual information.

JP2013-531022A discloses to include a three-dimensional shape measurement unit that measures a three-dimensional shape of a real object in a surface hardness measurement device for measuring hardness information of the real object corresponding to a virtual object in a virtual space presented to a user by haptics, a displacement measurement unit that measures displacement for each preset position on a surface of the real object from three-dimensional shape information obtained by the three-dimensional shape measurement unit, and a measurement control unit that estimates viscoelastic impedance for each position of the real object measured from a ratio or an amount of the displacement obtained by the displacement measurement unit to acquire hardness information for each predetermined position of the real object based on the estimated viscoelastic impedance.

SUMMARY

There are a technique of estimating a visual texture from an image and a technique of estimating a tactile texture from the image. However, since the respective textures are individually detected, correspondence between the respective positions cannot be obtained. Aspects of non-limiting embodiments of the present disclosure relate to an object texture measurement device capable of measuring a visual texture and a tactile texture in correspondence with respective positions.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an object texture measurement device includes a visual detection unit that detects a visual texture of an object, a tactile detection unit that detects a tactile texture of the object, and an acquisition unit that acquires a detection result of each of the visual detection unit and the tactile detection unit while relatively moving each of the visual detection unit and the tactile detection unit with respect to the object.

BRIEF DESCRIPTION OF THE DRAWINGS

Exemplary embodiment(s) of the present invention will be described in detail based on the following figures, wherein.

DETAILED DESCRIPTION

Figure 1:
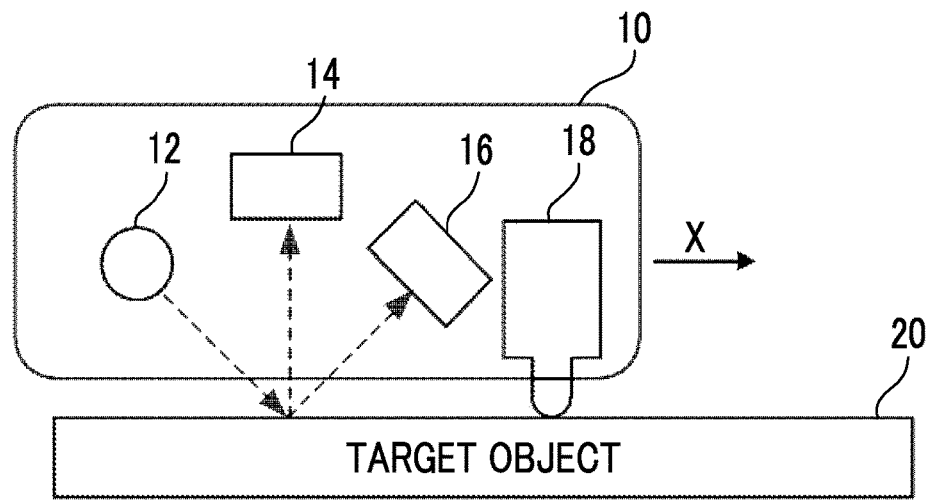
FIG. 1 is a diagram showing a schematic configuration of an object texture measurement device according to an exemplary embodiment.

Hereinafter, an example of the present exemplary embodiment will be described in detail with reference to drawings. FIG. 1 is a diagram showing a schematic configuration of an object texture measurement device according to the present exemplary embodiment.

An object texture measurement device 10 according to the present exemplary embodiment includes a light source 12, image sensors 14 and 16, and a force sensor 18. The object texture measurement device 10 measures a texture of an object while relatively moving with respect to a target object 20 whose texture of the object is to be measured. In the present exemplary embodiment, the object texture measurement device 10 measures the target object 20 while moving along a direction of an arrow X in FIG. 1. The light source 12 and the image sensors 14 and 16 correspond to a visual detection unit, the image sensor 14 corresponds to a second imaging unit, and the image sensor 16 corresponds to a first imaging unit. The force sensor 18 corresponds to a tactile detection unit.

The object texture measurement device 10 optically reads surface characteristics of the target object 20 to generate image information representing the read result and measures a surface state of the target object 20 to generate surface information representing the measurement result. The image information generated by the object texture measurement device 10 includes diffuse reflection image information based on diffuse reflection light and specular reflection image information based on specular reflection light.

The target object 20 is described as a planar object in the present exemplary embodiment, but is not limited to a plane and may be a three-dimensional target object.

In the object texture measurement device 10, the illustrated components are disposed at a predetermined width in a direction perpendicular to a paper surface. This direction is a main scanning direction of the object texture measurement device 10, and the direction indicated by the arrow X in the drawing is a sub scanning direction of the object texture measurement device 10.

The light source 12 emits light to the target object 20 for measuring a visual texture of the surface of the target object 20. The light source 12 is provided at a position where light is emitted at an incident angle of 45 degrees with respect to a measurement surface of the target object 20. White light such as a fluorescent lamp or a rare gas fluorescent lamp (xenon fluorescent lamp or the like) is employed as an example of the light source 12. The light source 12 may be a light source in which a plurality of white LEDs are arranged in the main scanning direction and a brightness distribution in the main scanning direction is made uniform using a diffusion plate or the like.

The image sensors 14 and 16 employ, for example, a line sensor or an area sensor and detect reflection characteristics (for example, bidirectional reflectance distribution (BRDF)) of the target object 20 as the visual texture of the target object 20. The light emitted from the light source 12 and reflected by the target object 20 is incident on the image sensors 14 and 16, and image signals according to the incident light is generated. In the present exemplary embodiment, the image sensor 14 is provided in a normal direction of the target object 20 and receives the diffuse reflection light of the light emitted from the light source 12 onto the target object 20. On the other hand, the image sensor 16 is provided in a direction at an angle of 45 degrees with respect to the normal direction of the target object 20 and receives the specular reflection light of light emitted from the light source onto the target object 20. The image sensors 14 and 16 are configured of, for example, photoelectric conversion elements such as a charge coupled device (CCD) linear image sensor and a complementary metal oxide semiconductor (CMOS) image sensor and convert the received light into a signal representing the intensity of the received light. Each of the image sensors 14 and 16 includes a color filter and generates image information representing a color of the target object 20. The image sensor 14 outputs the diffuse reflection image information obtained by receiving the diffuse reflection light. On the other hand, the image sensor 16 outputs the specular reflection image information obtained by receiving the specular reflection light.

The force sensor 18 moves relatively with respect to the target object 20 in contact with the target object 20 to detect the surface information representing smoothness, unevenness, hardness, and the like of the surface of the target object 20 as a tactile texture. A plurality of force sensors 18 are arranged along the main scanning direction. The force sensor 18 that performs the detection in a contact manner with the target object 20 will be described as an example of the tactile detection unit, but the invention is not limited thereto. For example, an ultrasonic sensor that performs the detection in a non-contact manner with the target object 20, a surface resistance sensor, or the like may be employed as the tactile detection unit. Any sensor having correlation and calibration with a Young's modulus measurement device serving as a reference device may be employed as the tactile detection unit. Alternatively, the plurality of types of sensors may be provided in combination. For example, a plurality of types of surface information at the same position may be detected at the same time by combining the sensors that perform the detections in a contact manner and in a non-contact manner with the target object 20.

Figure 2:
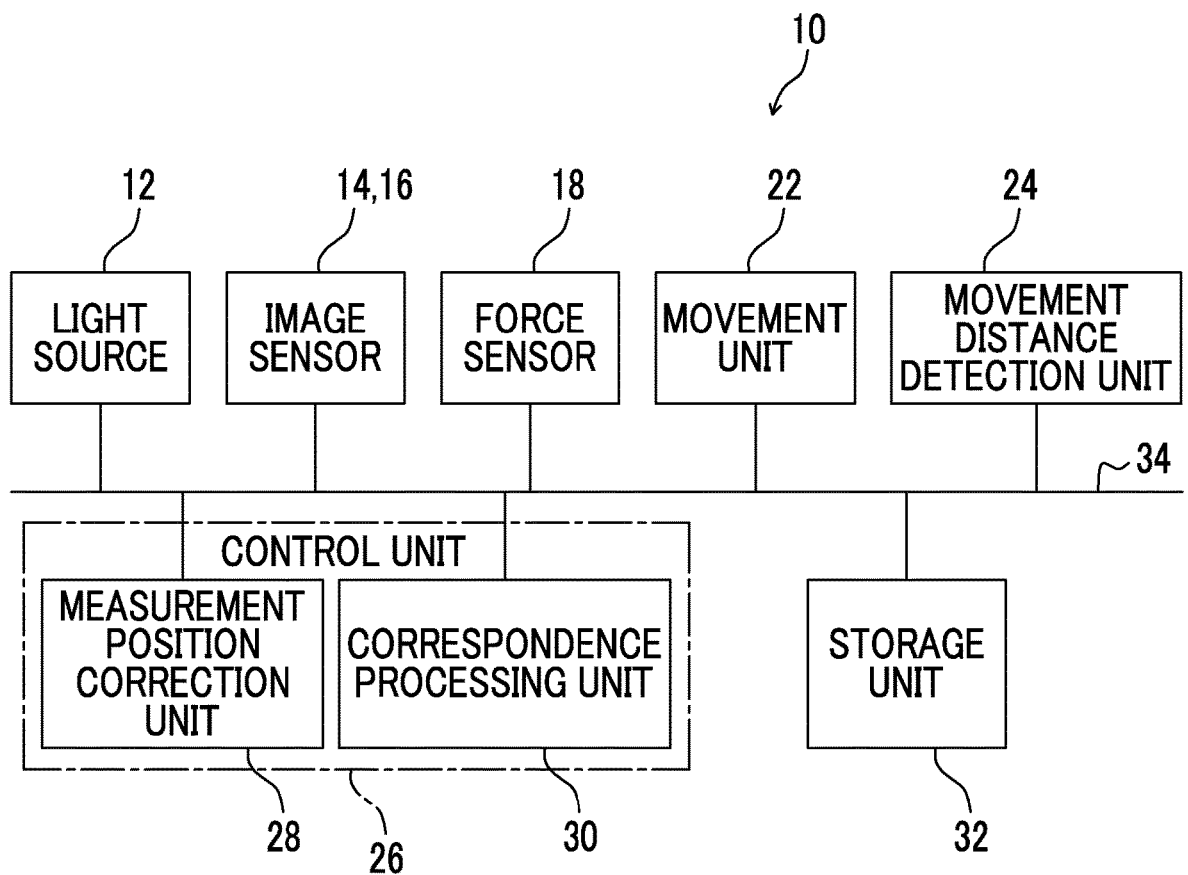
FIG. 2 is a block diagram showing a configuration of a control system of the object texture measurement device according to the present exemplary embodiment.

Next, a configuration of a control system of the object texture measurement device 10 according to the present exemplary embodiment will be described. FIG. 2 is a block diagram showing the configuration of the control system of the object texture measurement device 10 according to the present exemplary embodiment.

The light source 12, the image sensors 14 and 16, the force sensor 18, a movement unit 22, a movement distance detection unit 24 as the detection unit, a control unit 26, and a storage unit 32 are included in the object texture measurement device 10 and electrically connected to a system bus 34.

The movement unit 22 moves the object texture measurement device 10 relatively with respect to the target object 20 at the time of measuring the target object 20. For example, the movement unit 22 includes an actuator such as a motor and drives the actuator to relatively move the object texture measurement device 10 with respect to the target object 20.

The movement distance detection unit 24 detects a movement distance of the object texture measurement device 10 with respect to the target object 20. For example, the movement distance may be detected by a rotary encoder or the like, or from the image information obtained by the image sensor 14.

The control unit 26 is configured of a computer including a CPU (central processing unit) as an example of the processor, a read only memory (ROM), and a random access memory (RAM). The CPU controls the overall operation of the object texture measurement device 10. The RAM is used as a work area at the time of the CPU executing various programs. The ROM stores various control programs and various parameters in advance. In the present exemplary embodiment, the CPU executes the program stored in the ROM to execute functions of a measurement position correction unit 28 and a correspondence processing unit 30. The measurement position correction unit 28 and the correspondence processing unit 30 correspond to a processing unit.

A detection position of each of the image sensors 14 and and a detection position of the force sensor 18 are physically different from each other with respect to the target object 20. Therefore, the measurement position correction unit 28 performs a correction to adjust measurement positions based on a detection result of the movement distance detection unit 24 in order to adjust correspondence between the positions. In the present exemplary embodiment, the position measured by the force sensor 18 is measured by the image sensors 14 and 16 after the object texture measurement device 10 moves by a predetermined distance. The detection results of the image sensors 14 and 16 when the movement of the predetermined distance is detected after the measurement of the force sensor 18 are corrected as the measurement results at the same position of the target object 20 to perform the correction to adjust the measurement positions of the image sensors 14 and 16 with the measurement position of the force sensor 18. Accordingly, the visual texture and the tactile texture are considered to be measured at the same time.

The correspondence processing unit 30 makes the image information of the measurement results of the image sensors 14 and 16 that measure the same position of the target object 20 correspond to the surface information of the measurement result of the force sensor 18, based on the correction result of the measurement position correction unit 28.

The storage unit 32 stores the image information and the surface information made to correspond to each other by the correspondence processing unit 30. The storage unit 32 may employ, for example, a hard disk drive (HDD) or a non-volatile memory such as a flash memory.

Figure 3:
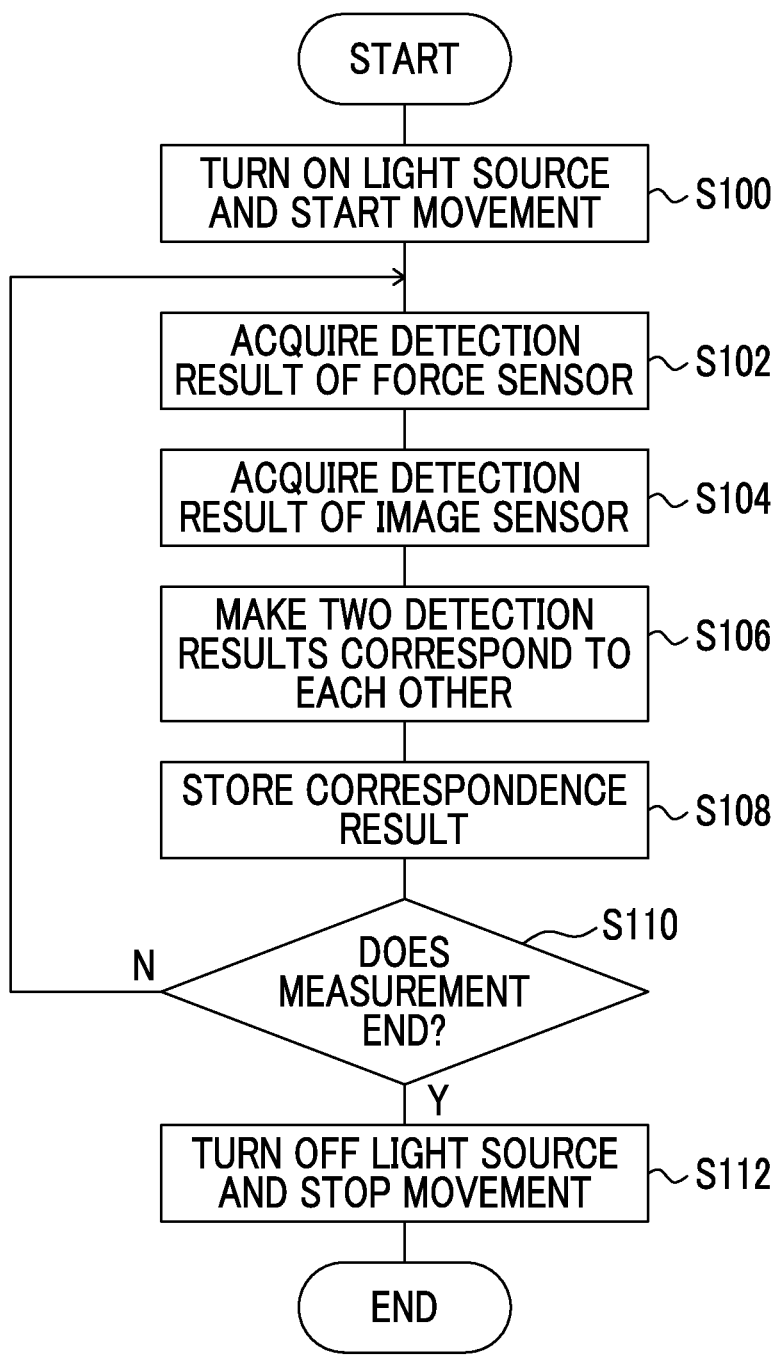
FIG. 3 is a flowchart showing an example of a flow of processing performed by a control unit of the object texture measurement device according to the exemplary embodiment.

Next, specific processing performed by the control unit 26 of the object texture measurement device 10 according to the present exemplary embodiment will be described. FIG. 3 is a flowchart showing an example of a flow of the processing performed by the control unit 26 of the object texture measurement device 10 according to the present exemplary embodiment. The processing in FIG. 3 is started, for example, in a case where a start button or the like (not shown) is operated to perform an instruction to start the measurement of the target object 20.

In step S100, the control unit 26 turns on the light source 12, drives the movement unit 22 to start the measurement, and the processing proceeds to step S102. Accordingly, the object texture measurement device 10 is moved relatively with respect to the target object 20 to start the measurement of the visual texture and the tactile texture.

In step S102, the control unit 26 acquires the detection result of the force sensor 18, and the processing proceeds to step S102. That is, the surface information is acquired from the force sensor 18. The processing in step S102 corresponds to second processing.

In step S104, the control unit 26 acquires the detection results of the image sensors 14 and 16, and the processing proceeds to step S106. That is, the diffuse reflection image information is acquired from the image sensor 14, and the specular reflection image information is acquired from the image sensor 16. The processing of step S104 corresponds to first processing. Further, the processing of step S102 and step S104 corresponds to an acquisition unit.

In step S106, the control unit 26 makes the detection results of the image sensors 14 and 16 correspond to the detection result of the force sensor 18, and the processing proceeds to step S108. More specifically, the detection positions of the image sensors 14 and 16 and the detection position of the force sensor 18 are physically different from each other with respect to the target object 20. Therefore, a correction to adjust the detection positions is performed based on the detection result of the movement distance detection unit 24 in order to adjust the respective detection positions. The correspondence processing unit 30 makes the image information of the detection results of the image sensors 14 and 16 correspond to the surface information of the detection result of the force sensor 18, which are obtained by detecting the same position of the target object, based on the correction result of the measurement position correction unit 28. The processing of step S106 corresponds to third processing.

In step S108, the control unit 26 stores the correspondence result in the storage unit 32, and the processing proceeds to step S110.

In step S110, the control unit 26 determines whether or not the measurement ends. In the determination, for example, determination is made whether or not a stop button or the like (not shown) is operated to perform an instruction to end the measurement of the target object 20. The processing returns to step S102 to repeat the above processing in a case where the determination is negative, and a series of pieces of processing ends in a case where the determination is affirmative.

By performing the processing as described above, the diffuse reflection image information and the specular reflection image information detected by the image sensors 14 and 16 are obtained as the measurement results of the visual texture, and the surface information detected by the force sensor 18 is obtained as the measurement result of the tactile texture. The correction to adjust the measurement positions of the measurement result of the visual texture and the measurement result of the tactile texture is performed for the correspondence. That is, the visual texture and the tactile texture are measured in correspondence with the respective positions.

Figure 4:
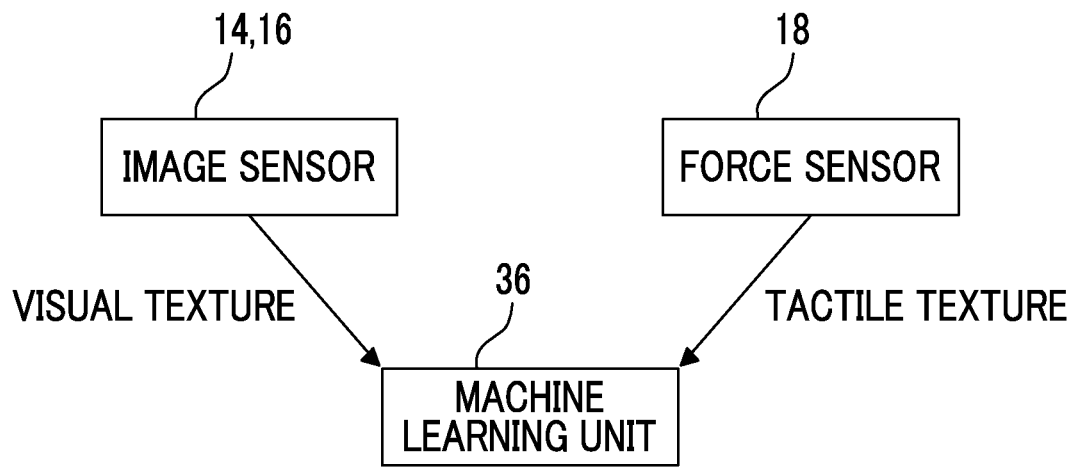
FIG. 4 is a diagram showing an example of using a measurement result of the object texture measurement device according to the exemplary embodiment.

For example, as shown in FIG. 4, the measurement result of the object texture measurement device 10 is input to the machine learning unit 36 to perform deep learning or the like of the visual texture and the tactile texture simultaneously. Therefore, the invention is applied to a service for reproducing a visual texture and a tactile texture with a device that reproduces the visual texture and the tactile texture from a captured image.

In the above exemplary embodiment, the example in which the object texture measurement device 10 is moved with respect to the target object 20 is described. However, the invention is not limited thereto, and the target object 20 may be moved with respect to the object texture measurement device 10.

In the above exemplary embodiment, the movement unit 22 is provided, and the object texture measurement device 10 is relatively moved with respect to the target object 20. However, the invention is not limited thereto. For example, the movement unit 22 may be omitted, and the object texture measurement device 10 or the target object 20 may be manually moved.

In the above exemplary embodiment, the case where the movement direction in which the object texture measurement device 10 and the object relatively move is determined is described as an example, but the invention is not limited thereto. For example, in a case where the movement direction is random or in a case where the movement is made manually, the movement direction is necessary to be detected for the correspondence between the measurement result of the visual texture and the measurement result of the tactile texture. In the case where the movement direction is random or in the case where the movement is made manually, for example, the movement distance detection unit 24 may further detect the movement direction, and the measurement position correction unit 28 may perform the correction to adjust the measurement positions based on the movement distance and the movement direction detected by the movement distance detection unit 24.

In the above exemplary embodiment, the light source 12 is provided at a position where the light is emitted at the incident angle of 45 degrees with respect to the normal direction of the target object 20, the image sensor 14 is provided in the normal direction of the target object 20, and the image sensor 16 is provided in the direction of 45 degrees with respect to the normal direction of the target object 20, the invention is not limited thereto. The light source 12 and the image sensors 14 and 16 may be disposed at any position as long as the image sensor 14 receives the diffuse reflection light and the image sensor 16 receives the specular reflection light.

Figure 5:
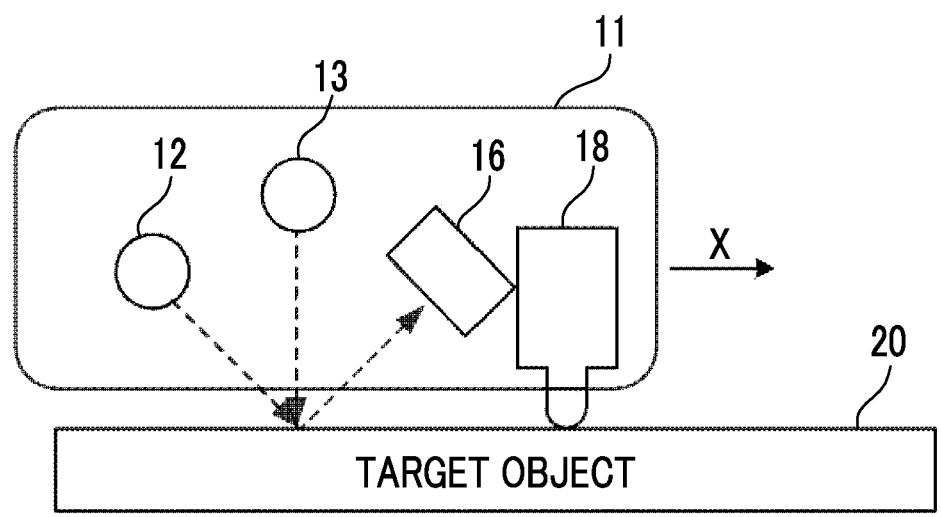
FIG. 5 is a diagram showing a schematic configuration of a modification example of the object texture measurement device according to the present exemplary embodiment.

In the above exemplary embodiment, the example is described in which the diffuse reflection image information and the specular reflection image information are obtained as the measurement results of the visual texture by the light source 12 and the image sensors 14 and 16. However, the configuration is not limited thereto. For example, as in an object texture measurement device 11 shown in FIG. 5, a configuration may be provided that includes a light source 12 as a first light source, a light source 13 as a second light source, and an image sensor 16 as an imaging unit. In the case, the light source 12 and the image sensor 16 are disposed in the same manner as in the above exemplary embodiment, and the light source 13 is disposed in the normal direction of the target object 20. Reading is performed twice to obtain diffuse reflection image information and specular reflection image information. That is, only the light source 12 is turned on to obtain a detection result of the image sensor 16 and thus the specular reflection image information is obtained. On the other hand, only the light source 13 is turned on to obtain a detection result of the image sensor 16 and thus the diffuse reflection image information is obtained.

In the above exemplary embodiment, the measurement position correction unit 28 is provided. However, the movement distance detection unit 24 and the measurement position correction unit 28 may be omitted depending on measurement resolution, measurement positions of the visual texture and the tactile texture, or the like.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processing performed by the control unit 26 according to the above exemplary embodiments may be performed by software, hardware, or a combination of both. Further, the processing performed by the control unit 26 may be stored in a storage medium as a program and distributed.

The invention is not limited to the above. Needless to say, other various modifications can be made within a range not departing from the spirit of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An object texture measurement device comprising:
   a visual detection unit, comprising an image sensor, that detects a visual texture of an object;
   a tactile detection unit, comprising at least one of a force sensor, a surface resistance sensor, an ultrasonic sensor or a sensor having correlation and calibration with a Young's modulus measurement device serving as a reference device, that detects a tactile texture of the object; and
   a processor configured to function as:
      an acquisition unit that acquires a detection result of each of the visual detection unit and the tactile detection unit while moving each of the visual detection unit and the tactile detection unit with respect to the object.

2. The object texture measurement device according to claim 1, further comprising:
   a movement unit that moves each of the visual detection unit and the tactile detection unit with respect to the object.

3. The object texture measurement device according to claim 1, further comprising:
   a detection unit, comprising an encoder, that detects a movement distance of each of the visual detection unit and the tactile detection unit relative to the object; and
   wherein the processor is further configured to function as:
      a processing unit that performs processing of adjusting detection positions of a detection result of the visual detection unit and a detection result of the tactile detection unit, using a detection result of the detection unit,
   wherein a direction of the relative movement is a predetermined direction.

4. The object texture measurement device according to claim 2, further comprising:
   a detection unit, comprising an encoder, that detects a movement distance of each of the visual detection unit and the tactile detection unit relative to the object; and
   wherein the processor is further configured to function as:
      a processing unit that performs processing of adjusting detection positions of a detection result of the visual detection unit and a detection result of the tactile detection unit, using a detection result of the detection unit,
   wherein a direction of the relative movement is a predetermined direction.

5. The object texture measurement device according to claim 1, further comprising:
   a detection unit, comprising an encoder, that detects each of a movement distance and a movement direction of each of the visual detection unit and the tactile detection unit relative to the object; and
   wherein the processor is further configured to function as:
   a processing unit that performs processing of adjusting detection positions of a detection result of the visual detection unit and a detection result of the tactile detection unit, using a detection result of the detection unit.

6. The object texture measurement device according to claim 2, further comprising:
   a detection unit, comprising an encoder, that detects each of a movement distance and a movement direction of each of the visual detection unit and the tactile detection unit relative to the object; and
   wherein the processor is further configured to function as:
   a processing unit that performs processing of adjusting detection positions of a detection result of the visual detection unit and a detection result of the tactile detection unit, using a detection result of the detection unit.

7. The object texture measurement device according to claim 1,
   wherein the tactile detection unit includes a plurality of types of sensors that detect a plurality of types of surface information representing a tactile texture of a surface of the object.

8. The object texture measurement device according to claim 2,
   wherein the tactile detection unit includes a plurality of types of sensors that detect a plurality of types of surface information representing a tactile texture of a surface of the object.

9. The object texture measurement device according to claim 3,
   wherein the tactile detection unit includes a plurality of types of sensors that detect a plurality of types of surface information representing a tactile texture of a surface of the object.

10. The object texture measurement device according to claim 4, wherein the tactile detection unit includes a plurality of types of sensors that detect a plurality of types of surface information representing a tactile texture of a surface of the object.

11. The object texture measurement device according to claim 5,
wherein the tactile detection unit includes a plurality of types of sensors that detect a plurality of types of surface information representing a tactile texture of a surface of the object.

12. The object texture measurement device according to claim 6,
wherein the tactile detection unit includes a plurality of types of sensors that detect a plurality of types of surface information representing a tactile texture of a surface of the object.

13. The object texture measurement device according to claim 7,
wherein the plurality of types of sensors include a sensor that detects the surface information representing the tactile texture of the surface of the object in a contact manner with the object and a sensor that detects the surface information representing the tactile texture of the surface of the object in a non-contact manner with the object.

14. The object texture measurement device according to claim 8,
wherein the plurality of types of sensors include a sensor that detects the surface information representing the tactile texture of the surface of the object in a contact manner with the object and a sensor that detects the surface information representing the tactile texture of the surface of the object in a non-contact manner with the object.

15. The object texture measurement device according to claim 9,
wherein the plurality of types of sensors include a sensor that detects the surface information representing the tactile texture of the surface of the object in a contact manner with the object and a sensor that detects the surface information representing the tactile texture of the surface of the object in a non-contact manner with the object.

16. The object texture measurement device according to claim 10,
wherein the plurality of types of sensors include a sensor that detects the surface information representing the tactile texture of the surface of the object in a contact manner with the object and a sensor that detects the surface information representing the tactile texture of the surface of the object in a non-contact manner with the object.

17. The object texture measurement device according to claim 1,
wherein the visual detection unit detects specular reflection light and diffuse reflection light from the object to detect the visual texture.

18. The object texture measurement device according to claim 17,
wherein the visual detection unit includes a single light source that emits light to the object, a first imaging unit that is provided at a position where the specular reflection light emitted from the light source and reflected by the object is received and images a surface of the object, and a second imaging unit that is provided at a position where the diffuse reflection light emitted from the light source and reflected by the object is received and images the surface of the object.

19. The object texture measurement device according to claim 17,
wherein the visual detection unit includes a single imaging unit that is provided at a position where reflection light from the object is received and images a surface of the object, a first light source that is provided at a position where the specular reflection light from the object is incident on the imaging unit and emits light to the object, and a second light source that is provided at a position where the diffuse reflection light from the object is incident on the imaging unit and emits light to the object.

20. An object texture measurement device comprising:
a processor configured to:
perform first processing of detecting a visual texture of an object via a visual detection unit comprising an image sensor, second processing of detecting a tactile texture of the object via a tactile detection unit comprising at least one of a force sensor, a surface resistance sensor, an ultrasonic sensor or a sensor having correlation and calibration with a Young's modulus measurement device serving as a reference device, and third processing of adjusting detection positions of a detection result of the visual texture detected by the first processing and a detection result of the tactile texture detected by the second processing.

* * * * *